United States Patent
Raymond

(10) Patent No.: US 7,637,181 B2
(45) Date of Patent: Dec. 29, 2009

(54) OPERATING DEVICE

(75) Inventor: Gilles Raymond, Romily du Perche (FR)

(73) Assignee: Thales (FR)

( * ) Notice: Subject to any disclaimer, the term of this patent is extended or adjusted under 35 U.S.C. 154(b) by 827 days.

(21) Appl. No.: 10/932,300

(22) Filed: Sep. 2, 2004

(65) Prior Publication Data

US 2005/0093663 A1   May 5, 2005

(30) Foreign Application Priority Data

Sep. 16, 2003   (FR) ................... 03 10870

(51) Int. Cl.
  G05G 5/06   (2006.01)
  G05G 1/00   (2006.01)
  H01H 9/00   (2006.01)
(52) U.S. Cl. ................ 74/527; 74/503; 200/4
(58) Field of Classification Search ........... 200/4, 200/11 G, 16 R, 16 B, 520, 521, 530; 74/527, 74/503, 553
See application file for complete search history.

(56) References Cited

U.S. PATENT DOCUMENTS

| | | | | |
|---|---|---|---|---|
| 3,431,371 A | * | 3/1969 | De Lorme et al. ......... | 200/16 B |
| 3,696,222 A | * | 10/1972 | Langan et al. ............. | 200/16 B |
| 4,225,758 A | * | 9/1980 | Kondo et al. ............... | 200/4 |
| 4,866,219 A | | 9/1989 | Templeton et al. | |
| 5,438,172 A | * | 8/1995 | Fowler et al. ............. | 200/11 R |
| 5,862,715 A | * | 1/1999 | Lemire ..................... | 74/553 |
| 6,803,531 B2 | * | 10/2004 | Muller et al. ............. | 200/4 |

FOREIGN PATENT DOCUMENTS

EP   0661908 A2  *  7/1995

* cited by examiner

Primary Examiner—Thomas R Hannon
Assistant Examiner—Justin Krause
(74) Attorney, Agent, or Firm—Lowe Hauptman Ham & Berner, LLP

(57) ABSTRACT

The invention relates to an operating device comprising a rod which is able to move translationally along an axis with respect to a housing, about an equilibrium position. The invention finds particular utility for a rotary encoder in which the rod can be moved both rotationally and translationally. According to the invention, the device comprises means for presenting a hard point during the translational movement of the rod.

19 Claims, 2 Drawing Sheets

US 7,637,181 B2

OPERATING DEVICE

RELATED APPLICATION

The present application is based on, and claims priority from, French Application No. 03 10870, filed Sep. 16, 2003, the disclosure of which is hereby incorporated by reference herein in its entirety.

BACKGROUND OF THE INVENTION

The invention relates to an operating device comprising a rod which is able to move translationally along an axis, with respect to a housing, about an equilibrium position. The invention finds particular, but non-exclusive, utility for a rotary encoder. More specifically, a rotary encoder is a device allowing data entry by means of the rotation of a rod about an axis. The data may be optically encoded in an electronic part of the device. The coder may also have additional means for inputting data when the rod is pulled or pushed about an equilibrium position. A translational force directed along the above-defined axis for rotation is then applied to the rod. The additional data input means may be used to validate a data item entered by the rotation of the rod.

To make this type of encoder more ergonomic, a number of equilibrium positions may be provided within the rotation of the rod, each position representing a separate data item. The equilibrium positions may be separated by a hard point. More specifically, the torque to be applied to the rod for passing from one equilibrium position to the next passes through a maximum. This allows a user operating the encoder to feel the rod passing at each equilibrium position. By contrast, provision has never been made for there to be a hard point for the force to be exerted when the user is pushing or pulling the rod of the encoder. The user is thus obliged either to observe that the data item entered by means of the translational movement of the rod is correctly entered or to apply a translational force to the rod which is very much greater than the force required to enter the data item, at the risk of damaging the encoder.

SUMMARY OF THE INVENTION

The object of the invention is to improve the ergonomics of existing encoders equipped with a pull/push function while at the same time allowing a user to feel by touch that a data item has been entered when he is pulling or pushing the rod of the encoder.

To this end, the subject of the invention is an operating device comprising a rod which is able to move translationally along an axis, with respect to a housing, about an equilibrium position, the rod moving translationally in a first direction beyond the equilibrium position when the rod is subjected to a force along the axis, the force being directed in the first direction until a first position in which the device delivers a first item of information has been reached, the rod moving translationally in a second direction, opposite the first direction, beyond the equilibrium position when the rod is subjected to a force along the axis, the force being directed in the second direction until a second position in which the device delivers a second item of information has been reached, wherein the device comprises means for presenting a hard point during the movement of the rod from the equilibrium position towards the first position.

BRIEF DESCRIPTION OF THE DRAWING

The invention will be better understood and other advantages will emerge on reading the detailed description of an embodiment of the invention given by way of example, the description being illustrated by the accompanying drawing in which.

DETAILED DESCRIPTION OF THE PREFERED EMBODIMENT

Figure 1:
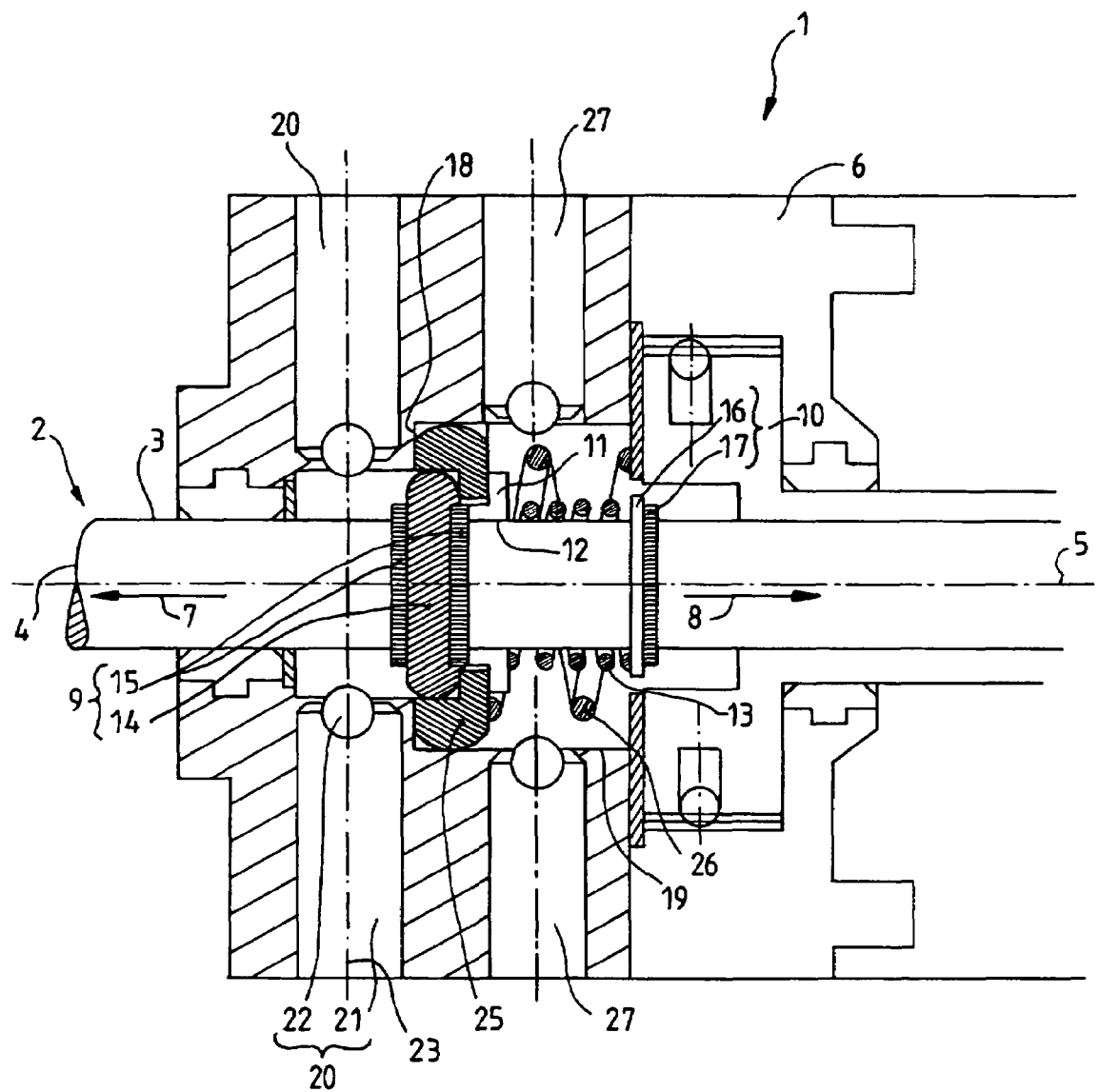
FIG. 1 represents, in sectional view through the axis of a rod, an encoder implementing the invention.

FIG. 1 represents an encoder 1 comprising an operating device 2 allowing a user to enter data. The operating device 2 comprises a rod 3, one end 4 of which is operated by the user. Advantageously, the rod 3 is free to rotate about an axis 5 with respect to a housing 6 in order to allow the operating device 2 to deliver an item of information when it is rotated about the axis 5. The rod 3 can be operated by means of a button (not shown) mounted on the end 4 of the rod 3.

The rod 3 is able to move translationally along the axis 5, with respect to the housing 6, about an equilibrium position represented in FIG. 1. Through the action of the user, the rod 3 moves translationally in a first, "pull" direction, represented by the arrow 7, beyond the equilibrium position when the rod 3 is subjected to a force along the axis 5, the force being directed in the first direction 7 until a first position in which the operating device 2 delivers a first item of information has been reached. Through the action of the user, the rod 3 moves translationally in a second, "push" direction, represented by the arrow 8, opposite the first direction 7, beyond the equilibrium position when the rod 3 is subjected to a force along the axis 5, the force being directed in the second direction 8 until a second position in which the device delivers a second item of information has been reached. According to the invention, the device comprises means for presenting a hard point during the movement of the rod 3 from the equilibrium position towards the first or second position.

Advantageously, the operating device 2 comprises means for presenting a hard point during the movement of the rod 3 from the equilibrium position towards the first position and means for presenting a hard point during the movement of the rod 3 from the equilibrium position towards the second position. In other words, the operating device 2 comprises two hard points, one on either side of the equilibrium position. One is passed beyond when the user pushes the rod 3 from the equilibrium position and the other is passed beyond when the user pulls the rod 3 from the equilibrium position.

Advantageously, the operating device 2 comprises means for returning to the equilibrium position when the force is relaxed. In other words, when the user relaxes his force on the rod 3 after one of the hard points has been passed beyond, the rod 3 returns to its equilibrium position.

The means for presenting a hard point during the removal of the rod 3 from the equilibrium position towards the first position advantageously comprise a first catch 9 and a shoulder 10 which are secured to the rod 3, a washer 11 through which the rod 3 passes via an orifice 12 in the washer 11, the washer 11 being free to rotate over a length of the rod 3, along the axis 5, between the first catch 9 and the shoulder 10, a first spring element 13 arranged between the shoulder 10 and the washer 11, and means for keeping the washer 11 immobile with respect to the housing 6 when the rod 3 is subjected to a force in the first direction 7. More specifically, the first catch 9 is in the form of a collar produced on the rod 3. To facilitate the production of this collar, the first catch 9 may comprise a washer 14 which is bored to match the outside diameter of the rod 3 and which is immobilized translationally with respect to the rod 3 by means of two stop segments 15 each positioned in grooves in the rod 3 on either side of the washer 14. Similarly, to facilitate the production of the shoulder 10, it may comprise a washer 16 which is bored to match the outside diameter of the rod 3 and is kept in contact with a stop segment 17 positioned in a groove in the rod 3. The stop segment 17 forms a stop preventing translational movement of the washer 16 with respect to the rod 3 along the axis 5 in the second direction 8. The first spring element 13 is, for example, formed by a helical spring. The means for keeping the washer 11 immobile with respect to the housing 6 when the rod 3 is subjected to a force in the first direction 7 comprise, for example, a shoulder 18 produced in a bore 19 of the housing 6. The washer 11 bears against the shoulder 18 when the rod is moved in the first direction 7.

Advantageously, the means for presenting a hard point during the movement of the rod 3 from the equilibrium position towards the first position comprise a first element 20 which opposes the movement of the first catch 9 in the first direction 7 and is retracted when the first catch 9 passes in front of the first element 20. The first element 20 is, for example, formed by a ball screw or a ball bush. The screw or the bush comprises a body 21 fastened to the housing 6 and a ball 22 which can move with respect to the body 21 along an axis 23 which is substantially perpendicular to the axis 5. The screw or the bush additionally comprises a spring element 24 which opposes the movement of the ball 22 along the axis 23 in a direction away from the axis 5. During the movement of the first catch 9 in the first direction 7, the force to be provided by the user is equal to the superimposition of two forces: the force applied by the first spring element 13 and the force required for the first catch 9 to repel the ball 22. The force applied by the first spring element 13 is proportional to the travel of the rod 3 along the axis 5 in the first direction 7. The force required for the first catch 9 to repel the ball 22 constitutes the hard point. This is a force which the user must overcome over a small part of the travel of the rod 3 separating the equilibrium position of the rod 3 and the first position. The hard point is felt by the touch of the user.

In order to balance the force required for the first catch 9 to repel the ball 22 with respect to the axis 5, the operating device 2 may comprise a number of elements 20, the respective axes of which are concurrent over the axis 5. FIG. 1 shows two elements 20 with their respective axes in the continuation of one another.

The various elements forming the means for presenting a hard point during the movement of the rod 3, namely the first catch 9, the shoulder 10, the washer 11, the first spring element 13, the means for keeping the washer 11 immobile with respect to the housing 6 when the rod 3 is subjected to a force in the first direction 7, and the first element 20, are all arranged about the rod 3. In other words, none of these elements is arranged in the continuation of the rod 3. This arrangement makes it possible to employ the invention on existing equipment, such as, for example, an optical encoder, without modifying the length of the rod 3.

Advantageously, the means for presenting a hard point during the movement of the rod 3 from the equilibrium position towards the second position comprise a second catch 25 in the form of a washer through which the rod 3 passes. When the rod 3 is in the equilibrium position, the first catch 9 bears against the second catch 25 through the action of the first spring element 13 and the second catch 25 bears against the housing 6 through the action of a second spring element 26 arranged between the second catch 25 and the housing 6. The second spring element 26 tends to repel the second catch 25 along the axis 5 in the first direction 7 in order to keep it in contact with the housing 6 and, more specifically, against the shoulder 18. When the rod 3 is in the equilibrium position, the washer 11 bears against the housing 6 by way of the second catch 25.

Advantageously, the means for presenting a hard point during the movement of the rod 3 from the equilibrium position towards the second position comprise a second element 27 which opposes the movement of the second catch 25 in the second direction 8 and is retracted when the second catch 25 passes in front of the second element 27. As for the element 20, it is possible to have a number of elements 27 about the rod 3. FIG. 1 shows two elements 27 in the continuation of one another.

Advantageously, in order to standardize the elements forming the operating device, the first element 20 and the second element 27 may be identical.

During the movement of the second catch 25 in the second direction 8, the force to be provided by the user is equal to the superimposition of two forces: the force applied by the second spring element 26 and the force required for the second catch 25 to repel the ball 22. The force applied by the second spring element 26 is proportional to the travel of the rod 3 along the axis 5 in the second direction 8. The force required for the second catch 25 to repel the ball 22 constitutes the hard point.

Figure 2:
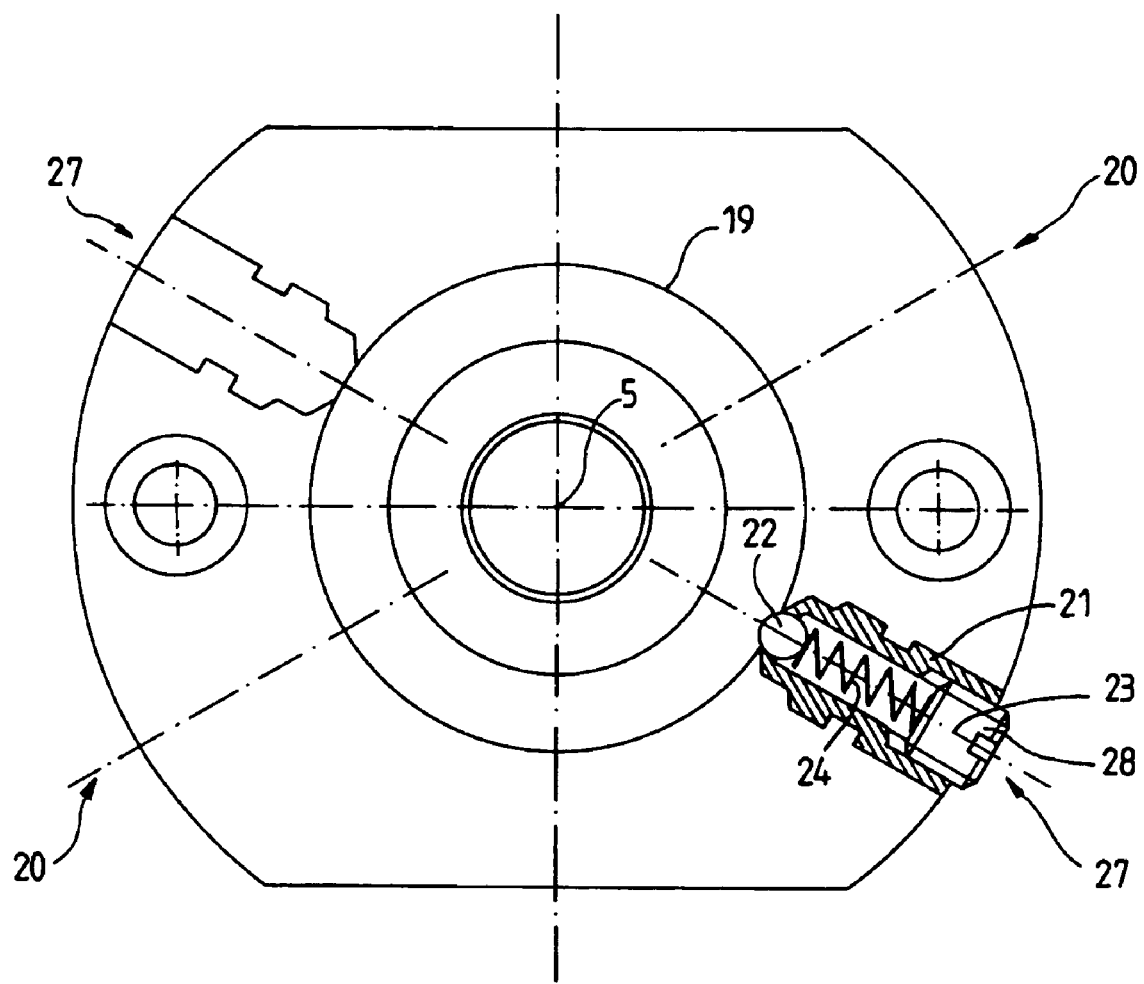
FIG. 2 represents, in sectional view through an axis perpendicular to the axis of the rod, a mechanical part forming the housing of the encoder.

FIG. 2 represents, in section through a plane perpendicular to the axis 5, the housing 6 in which is mounted an element 27 and, more specifically, a ball bush comprising the body 21, the ball 22, the spring element 24 in the form of a helical spring, and a screw 28 for adjusting the force exerted by the spring element 24 on the ball 22. As has been seen above, it is possible to position another element 27 arranged symmetrically with respect to the intersection of the axis 23 and the axis 5.

If it is desired to move the two hard points closer to the equilibrium position, it will be difficult to arrange the elements 20 and 27 in a common plane containing the axis 5 as represented in FIG. 1. To overcome this difficulty, it is possible to arrange the elements 20 and 27 in planes which are different but contain the axis 5. This arrangement is represented in FIG. 2. To prevent the figure from being overloaded, only the axes 23 of the elements 20 have been represented.

The invention claimed is:

1. An operating device comprising:
   an axially displaceable rod movable in a first axial direction beyond an equilibrium position when subjected to a first axially acting force to a first position in which the operating device is adapted to issue a first item of information, the rod being axially movable in a second axial direction, opposite the first axial direction, beyond the equilibrium position in response to a second axially acting force to a second position in which the device is adapted to issue a second item of information,
   a first catch arrangement disposed on the rod;
   a second catch arrangement disposed on the rod;
   a first detent hard point arrangement engageable with the first catch arrangement during the movement of the rod from the equilibrium position towards the first position; and
   a second detent hard point arrangement engageable with the second catch arrangement during the movement of the rod from the equilibrium position towards the second position.

2. The device according to claim 1, wherein the first and second detent hard point arrangements are respectively arranged around the rod.

3. The device according to claim 1, wherein the operating device comprises springs for returning the rod to the equilibrium position when the first and second axially acting forces are absent.

4. The device according to claim 1, wherein the rod is rotatable about the axis along which the rod is axially displaceable and wherein the operating device is configured to deliver a third item of information when the rod is rotated about the axis.

5. The device according to claim 1, wherein the first catch arrangement comprises:
a first stop segment, and
a washer disposed so that the rod passes via an orifice in the washer, the washer being configured to rotate about and move along a length of the rod and engage the first stop segment and a shoulder arrangement in the housing,
a first spring element engageable with the washer, and
means for keeping the washer immobile with respect to the housing when the rod is subjected to a force in the first axial direction.

6. The device according to claim 5, wherein the means for keeping the washer immobile comprise a second stop segment kept in contact with the washer when the rod is subjected to a force in the first direction.

7. The device according to claim 6, wherein the operating device comprises a second spring element arranged to bias the second stop segment against the washer.

8. The device according to claim 7, wherein a means for presenting the second detent hard point comprises a second element which opposes the movement of the second catch arrangement in the second direction and is retracted when the second catch arrangement passes in front of the second element.

9. The device according to claim, 1 wherein the first hard point detent arrangement comprise a first element which opposes the movement of the first catch arrangement in the first direction and is retracted when the first catch arrangement passes in front of the first element.

10. The device according to claim 9, wherein means for keeping the washer immobile comprise a second stop segment kept in contact with the washer when the rod is subjected to a force in the first direction.

11. The device according to claim 10, wherein the operating device comprises a second spring element arranged between the second catch arrangement and the housing.

12. The device according to claim 11, wherein a means for presenting the second detent hard point comprises a second element which opposes the movement of the second catch in the second direction and is retracted when the second catch arrangement passes in front of the second element.

13. The device according to claim 12, wherein the first element and the second element each comprise a ball and a third spring element which repels the ball in the direction of the rod, substantially perpendicularly to the axis.

14. The device according to claim 1, wherein the first catch arrangement comprises an annular member having a first diameter and wherein the second catch arrangement comprises a second annular member having a second diameter which is greater than the first diameter.

15. The device according to claim 1, wherein the first catch arrangement engages the second catch arrangement in the equilibrium position, separates from the second catch arrangement when the rod is moved in the first direction and remains in contact with the second catch arrangement when the rod is moved in the second direction.

16. An operating device comprising:
a rod translationally movable along an axis, with respect to a housing, in a first direction beyond an equilibrium position in response to a first force acting in a first axial direction until a first position in which the operating device delivers a first item of information, is reached, and in a second axial direction, opposite the first axial direction, beyond the equilibrium position when the rod is subjected to a second axially acting force, to a second position in which the device delivers a second item of information, is reached, the operating device comprising;
a first detent element which opposes movement of a first annular catch element in the first direction, which is located in a first predetermined position on a periphery of the rod, in and which is retracted when the first annular catch element passes in front of the first detent element; and
a second detent element which opposes movement of a second annular catch element in the second direction, which is located in a second predetermined position on a periphery of the rod, and which is retracted when the second annular catch element passes in front of the second detent element.

17. An operating device comprising:
a rod translationally movable along an axis, with respect to a housing, and
an equilibrium position, wherein the rod is:
translationally movable in a first direction beyond the equilibrium position when the rod is subjected to a force along the axis, the force being directed in the first direction until a first position in which the operating device delivers a first item of information is reached, wherein the rod is:
translationally movable in a second direction, opposite the first direction, beyond the equilibrium position when the rod is subjected to a force along the axis, the force being directed in the second direction until a second position in which the device delivers a second item of information,
a first catch secured to the rod,
a washer through which the rod passes via an orifice in the washer, the washer being free to rotate about and slide over a length of the rod with respect to the first catch, and
a first spring engaging the washer and for biasing the washer toward the first catch and against a second catch and keeping the washer and the second catch immobile with respect to the housing when the rod is moved in the first direction.

18. The operating device of claim 17, wherein the operating device comprises a second spring arranged between a second catch and the housing.

19. The operating device of claim 18, further comprising means for presenting a hard point having a second element which opposes the movement of the second catch arrangement in the second direction and is retracted when the second catch arrangement passes in front of the second element.

* * * * *